July 7, 1942.  E. A. ROCKWELL  2,289,043
VALVE DEVICE
Original Filed Nov. 8, 1938  3 Sheets-Sheet 1

INVENTOR
Edward A. Rockwell
BY
Arthur Wright
ATTORNEY

July 7, 1942.   E. A. ROCKWELL   2,289,043
VALVE DEVICE
Original Filed Nov. 8, 1938   3 Sheets-Sheet 2

INVENTOR
Edward A. Rockwell
BY
Arthur Wright
ATTORNEY

July 7, 1942.  E. A. ROCKWELL  2,289,043
VALVE DEVICE
Original Filed Nov. 8, 1938  3 Sheets-Sheet 3

INVENTOR
Edward A. Rockwell
BY Arthur Wright
ATTORNEY

Patented July 7, 1942

2,289,043

UNITED STATES PATENT OFFICE 2,289,043

VALVE DEVICE

Edward A. Rockwell, Forest Hills, N. Y., assignor to The New Britain Machine Company, New Britain, Conn., a corporation of Connecticut Original application November 8, 1938, Serial No. 239,436. Divided and this application December 1, 1939, Serial No. 307,117

19 Claims. (Cl. 121—46.5)

My invention relates particularly to a valve device which is applicable to systems for the application of power for any desired purpose but also has especial application in connection with the operation of automotive accessories.

This is a divisional application of my application upon Power system, Ser. No. 239,436, filed November 8, 1938.

The object of my invention is to provide a valve device of general utility adapted to be used in a system for the application of power for any desired purpose, but it is especially useful in connection with the operation of automobiles and other automotive accessories. The said device is particularly adapted for use in a self-contained power unit which is capable of being mounted wherever desired upon an automobile or other automotive vehicle, inasmuch as the connections to the operating parts of the automotive structure are fully hydraulic, that is to say without the necessity of applying mechanical reaction members or devices between said unit and any accessory to be operated thereby. A further important object is the application of the same for the operation of brakes, the same being constructed in such a manner that the said brakes are moved into operative position manually initially, after which the power from said power unit is brought into action to apply the desired braking effect to the wheels, thus eliminating the necessity of utilizing the high pressure hydraulic power except in the actual braking effort to be applied. This enables, furthermore, the braking effort to be applied effectively, without requiring the movement of the foot pedal through substantially its entire available range of movement, as was previously required in other systems. Also, this avoids having to allow for lost-motion in lever and link connections. This permits the manual application of the braking effort in case of any failure of the application of power to the brakes. This also avoids lag in the relative movement of the parts. This arrangement is such, furthermore, as to permit the placement of the power unit at practically any point on an automobile chassis, which is of importance due to the limited space available in automobiles as now manufactured. It also enables the unit to be removed from danger of contact with road obstructions. In view of the said unit being provided with connections which are fully hydraulic, furthermore, the installation can be carried out in a very small fraction of the time that was required in the case of previous systems having mechanically operating connections thereto. This enables, furthermore, the unit to be readily serviced by merely removing the unit and connecting a new power unit in its stead to the required tubular lines. The power unit is so constructed that it does not exert any thrust on the automotive parts on which it is mounted and will consequently retain its position when so mounted without danger of displacement or loosening, and even in the event of such loosening or displacement, will continue to function nevertheless. The whole structure and installation can, therefore, be applied to automobiles with a very small fraction of the cost hitherto necessary in power units used for the operation of automobile accessories.

Further objects of my invention will appear from the detailed description of the same hereinafter.

While my invention is capable of being carried out in many different ways, for the purpose of illustration I have shown certain embodiments of the same in the accompanying drawings, in which—

Fig. 3 is an end elevation of a casting contained within the outer casing taken from the left end of Fig. 2;

Fig. 4 is a vertical section on line 4—4 of the same looking from the right towards the left of Fig. 2.

Figure 1:
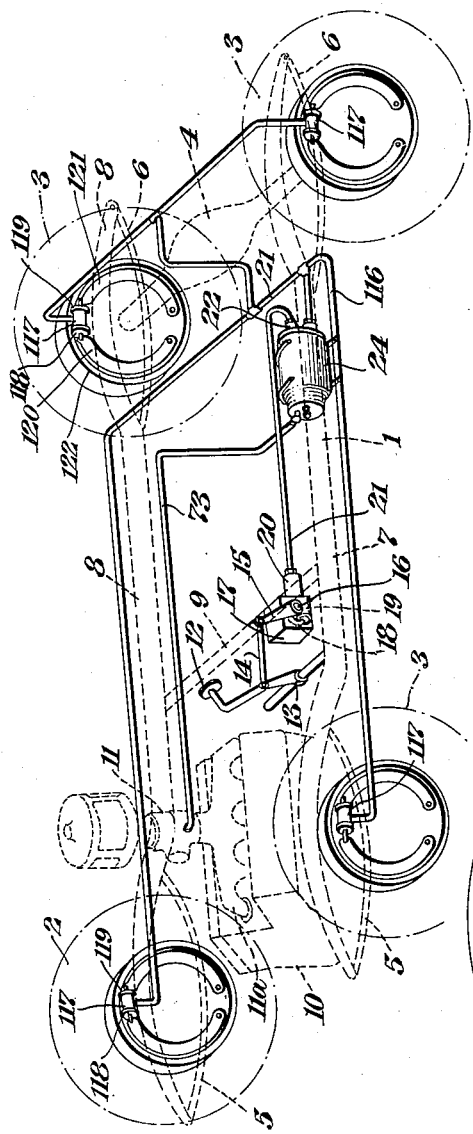
Fig. 1 is a diagrammatic perspective view of an automobile chassis equipped with my invention, as adapted to be operated by a vacuum.

Referring first to Figs. 1 to 4, I have shown an automobile chassis 1 having front wheels 2 and rear wheels 3 mounted on the chassis, having a rear axle 4, by means of springs 5 and 6, respectively, the same being connected to longitudinal frame members 7 and 8 having a crossbeam 9, as well as an internal combustion engine 10 having a down-draft carburetor 11 leading to an engine manifold 11a and having any other usual desired equipment. On the said chassis, accessible to the driver, there is a foot pedal 12 carried by a pivot 13 on the chassis, which is connected by a link 14 to an operating lever 15 tight on a shaft 16 which extends into the interior of a master cylinder of any desired kind, as, for example, a Loughead master cylinder 17, which may be constructed in accordance with the master cylinder shown in the Loughead et al. Patent No. 1,707,063, granted March 26, 1929. The said shaft 16 operates an arm 18 within the master cylinder, which is adapted to move a piston 19 therein which operates in a cylinder 20 having a hydraulic pressure fluid pipe connection 21, which may be flexible. The master cylinder 17 is mounted in any desired way, upon one of the frame members 9 of the chassis 1. The said pipe 21 is connected by a fitting 22 to a casting 23 forming a part of a power unit 24 which is mounted on the automobile chassis 1 in any desired manner and at any desired point thereon but, for example, by means of U-shaped bolts 25 and 26 secured in place by nuts 27 on the frame member 7. Within the casting 23 there is a passageway 28 which is connected by a fitting 29 to a tube 30 attached by a fitting 31 to a transverse passageway 32 which is located in a valve casing 33 screw-threaded to a cylindrical member 34, which in turn is screw-threaded also to the casting 23. Between the casing 33 and the cylinder 34 there is a rubber seal 34a which is U-shaped in cross-section and is supported on one face thereof by a washer 34b having serrations 34c at one face thereof, to permit the passage of liquid, the said seal 34a being supported at its other side by a ring 34d. The liquid from the master cylinder thus conveyed by the tube 30 and the port 32 is received in a circular recess 35 in the valve casing 33, said recess having therein a serrated ring 36 having four serrations 37 thereon, said ring being supported within a U-shaped rubber seal 38 to provide a seal around a valve plunger 39, hereinafter described more in detail. On account of the serrations 37 the hydraulic fluid is allowed to pass from the recess 35 into a passageway 40 in the casing 33 and thence through a fitting 41 to a tube 42, a fitting 42a, and a tiny capillary opening 42b to prevent the actuation of the atmospheric inlet and outlet valve, hereinafter described, before the brake shoes have been moved into position, and thence to a pressure chamber 43 located in a casting 44 on the other end of the power unit, which is closed by a screw-plug 45 having an inner end 46 of reduced diameter through which there are four radial passageways 47 connecting to a longitudinal passageway 48 to act as a passage for the escape of any accumulated air from the hydraulic fluid. The passageway 48 is normally closed by means of a screw-plug 49 having within the same a removable screw-threaded closure 50, upon the removal of which any accumulated air may be allowed to escape. The pressure chamber 43 thus permits manual pressure to be applied to a plunger 51 in the casting 44 in which it is sealed by an annular U-shaped rubber seal 52 held in place by a washer 53 and a snap-ring 54. The said plunger 51 is connected to a dished relief outlet valve 55 or vacuum valve 55 in a vacuum chamber 56 in the casting 44, which is connected by passageways 56a and 56b to the exterior of said casting 44 and which is also connected by a longitudinal passageway 57 to a check-valve casing 58 having a check-valve 59 therein forced against its seat by a spring 60. Within the check-valve casing 58 there is a longitudinal passageway 61 communicating with lateral ports 62 which can be more or less closed and the tension of the spring 60 on the valve 59 altered, as desired, by a screw-threaded plug 63 within the said passageway 61 and which can be rotated by means of a squared extension 64 thereon fitting within a similar recess 65 in a rotatable adjusting member 66 carried within a screw-plug 67 in the check-valve casing 58, said rotatable member 66 having a pointer 68 cooperating with a graduated scale on the outside of the plug 67 and being held outwardly by means of a star-shaped spring 69. The ports 62 lead to a circular passageway 70 within a fitting 71 around the casing 58 and having a nipple 72 to which there is connected a flexible hose 73 by means of a clip 74. The hose 73 leads to the engine manifold 11a. A spacing member 75 is provided around the check-valve casing 58 and a flange 76 is provided on the screw-plug 45 to act as spacing members to hold in place an air filter casing 77 on the outside of said unit, having an air inlet opening 78 leading to a space 79 filled with horsehair, and also for holding in place an end housing 80 through which the plug 45 and the valve casing 58 extend. A gasket 81 is located between the end housing 80 and the casting 44. The air thus admitted to the chamber 79 passes through a screw-plug 82 in the casting 44 and thence into a passageway 83 in the casting 44, and passes through an opening 84 in a rubber diaphragm 85 and finally into an air chamber 86, on the opposite side of said diaphragm 85 from the location of the relief valve or vacuum valve 55. It will be noted that the said diaphragm 85 acts as a valve seat for the valve 55. On the same side of the diaphragm 85 as the valve 55 there is a supporting ring 87a for limiting the movement of said diaphragm in one direction and to act as a support for an air inlet valve 87 when said valve 87 is in closed position, against said diaphragm 85. There is also on the same side of the diaphragm 85 as the valve 87 a central ring 88, the outside diameter of which is slightly larger than the inside diameter of the ring 87a and on the opposite side of said diaphragm 85 there is a supporting ring 89, the rings 88 and 89 being held in place by a ferrule 90 and by a horseshoe washer 91. The ferrule 90 is arranged to support one end of a spring 92, the other end of which passes through an extension 93 of the ferrule 90 leaving air ports 93a between the ferrule and the extension on which the valve 87 is mounted as well as a rubber diaphragm 94 and a ring 95, the same being held in place by a horseshoe-shaped washer 96. Attached to the casting 44 there is a spacing member 97 between the two diaphragms 85 and 94, the same being held in place by a plurality of screws 98, which latter also support a cylinder 99 having a dished end provided with a plurality of holes 100 therein and acting as a support for one end of the spring 92. Said cylinder is located around the plunger 39, the latter being connected therein to a piston 101 which is comprised of two end plates 102 and 103 having located between the same a leather ring 104 which has a right-angle cross-section so as to fit within the cylinder 99. Also, there is carried on the plunger 39, adjacent to the plate 103, a retainer shell 105 for holding in place a felt ring 106 which acts as a peripheral support for the leather ring 104. A washer 107 is provided for holding these plates in place on the plunger 39 and around said plunger there is furthermore provided a light helical spring 108, one end of which abuts against the piston 101 while the other end of which seats against a closure 109, mounted on the valve housing 33, for said cylinder 99, having openings 110 to give access to the vacuum in which the cylinder 99 is submerged and surrounded. A cork packing 111 is located around the plunger 39, held in place by a shell 112 thereon. When the pressure in the pressure chamber 43, in the manner hereinafter described, causes the plunger 39 to be moved to the right, in Fig. 2, the said plunger 39 cuts off access of the pressure fluid from the tube 30 to the interior of the cylinder 34 so that further movement of the plunger 39 to the right forces the trapped liquid in the cylinder 34 out through a port 113 and thence through a fitting 114 into a tube 115, which is then conveyed by a pipe system 116 to four wheel cylinders 117, all of which are constructed alike and each of which carries two pistons 118 and 119 for operating, respectively, brake shoes 120 and 121, which in this way apply the brakes to wheel drums 122 located on the wheels 2 and 3. In completing the power unit there is fastened onto one end of the unit a cover 123 by means of screws 124 on the casting 23 and a ring 125 is spun onto flanged edges of the cover 123 and the housing 80 so as to make a tight joint, thus submerging all the parts within same in a vacuum. For oiling purposes there is an inlet fitting 125a closed by a plug 125b and which is connected by a pipe 125c to the interior of the cylinder 99.

Figure 5:
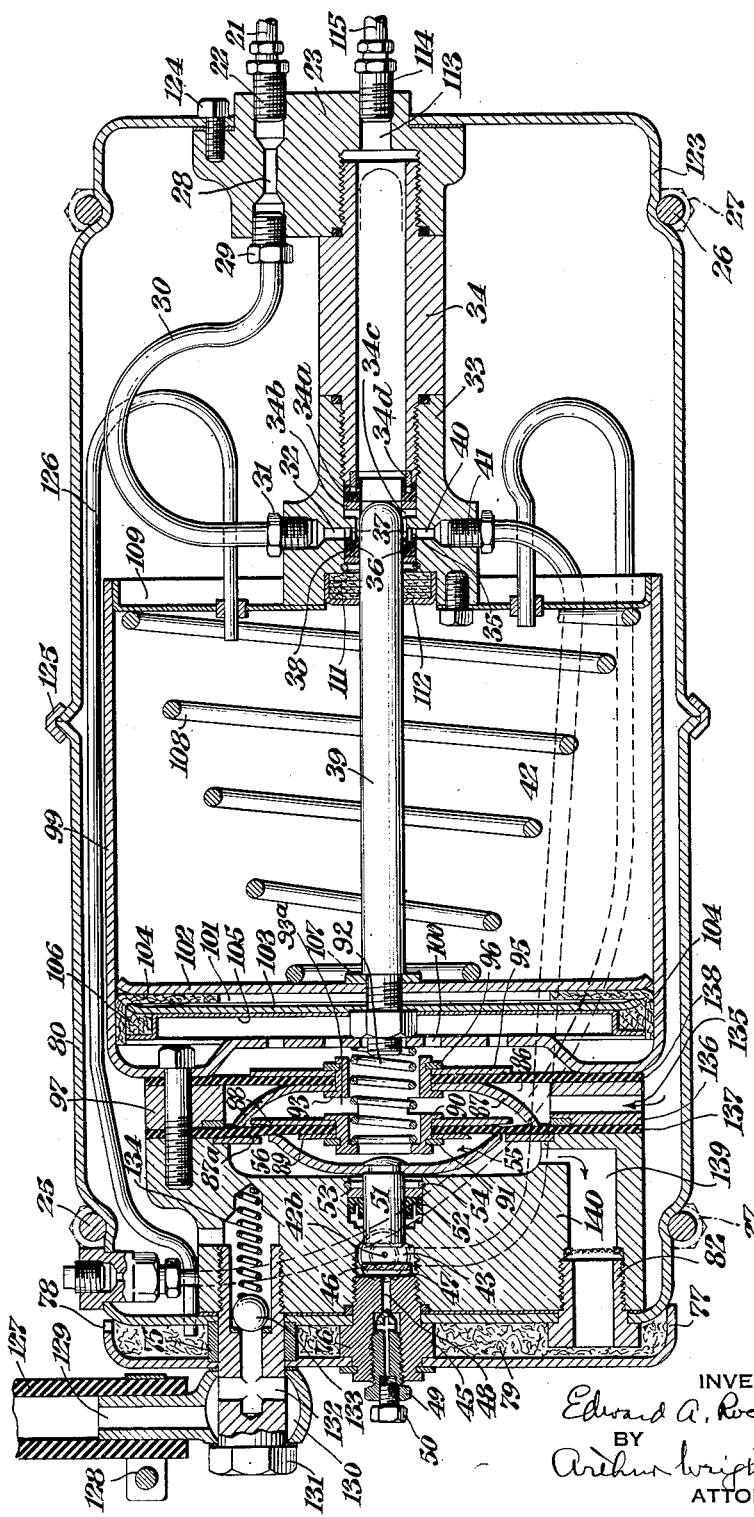
Fig. 5 is a longitudinal vertical section of a modified form of my invention, in which compressed air is used instead of a vacuum, and showing diagrammatically the connections thereto.

In the modification of my invention, as shown in Fig. 5, the construction of the apparatus is the same as in the preceding figures except in the following respects: In this instance, instead of the source of vacuum there is provided a source of compressed air. Furthermore, the housing 80 and cover 123 are made strong enough to withstand whatever compressed air pressures are used. Also, in this instance the apertures 110 are omitted and an adequate breather tube 126 is connected from the tight closure 109 to the space 79. Furthermore, there is provided a source of compressed air 127 connected by a clip 128 to a nipple 129 having an annular passageway 130 through which passes a screw plug 131 having ports 132 leading to a ball check-valve 133 seated by a spring 134 so as to provide a body of compressed air within the housing 80 and cover 123. The compressed air thus supplied enters the valve structure through a port 135 in a spacing member 136 between diaphragms 137 and 138 which are constructed like the diaphragms 85 and 94. The exhaust air in this instance, when escaping from the valve 55, passes out through a passageway 139 in a casting 140, which is in other respects constructed like the casting 44, so that said air reaches the space 79 in communication with the outer air. Also ports 56a and 56b are omitted.

Figure 2:
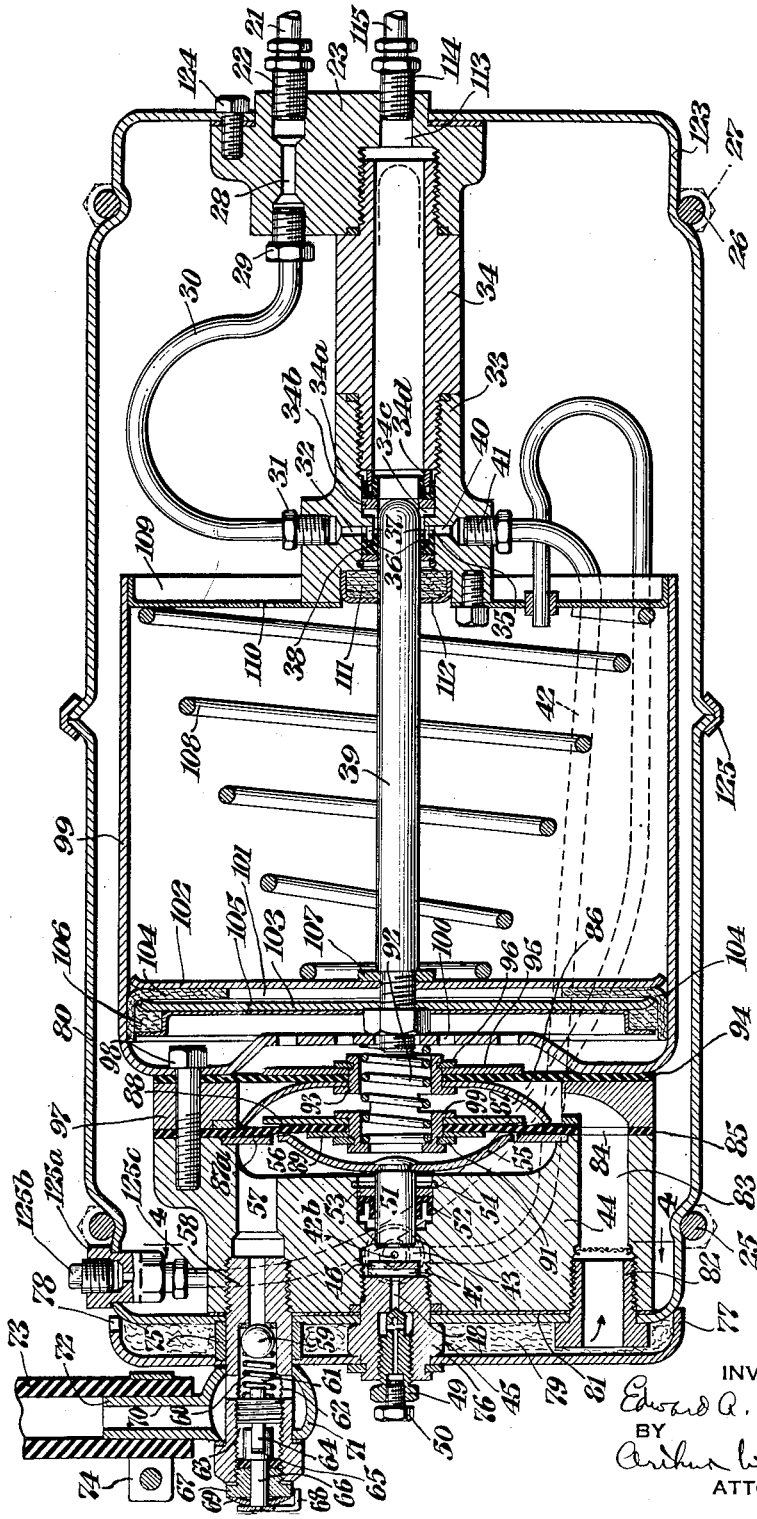
Fig. 2 is a longitudinal vertical section of the power unit shown in Fig. 1 showing the position at the initial application of hydraulic pressure.

In the operation of my invention, referring first to Figs. 1 to 4, the engine 10 being in operation and the vacuum being thus available through the pipe 73, the same is conveyed to the vacuum chamber 56 of the power unit 24 and thence through the passageways 56a and 56b so as to submerge all the parts in the housing 80 in the vacuum by way of the passageway 57, chamber 56, passageways 56a and 56b to the inside of the housing 80 and cover 123. Also, the vacuum will extend from beneath the valve 55, which has no force seating it, through the ferrule 90 to the left face of the piston 101. When the pedal 12 is pressed downwardly to the extent desired, by the foot, the lever arm 18 within the master cylinder 17 moves the piston 19 to force the hydraulic fluid in the pipe 21 into the power unit 24 and through the pipe 30 around the right-hand end of the plunger 39 and thence by the pipe 115 to the wheel brake cylinders 117 so as to move the pistons 118 and 119 and thereby move the brake-shoes 120 and 121 up to the point of contact with the brake drums 122. Up to this point the spring 92 will remain substantially fully extended, the valve 55 will remain lightly in contact with the diaphragm 85 as shown in Fig. 2 permitting the passage of the vacuum beneath the valve 55 and the atmospheric inlet valve 87 will have remained closed due to the atmospheric air pressure in the closed position of the valve 87, entering through the port 84 and exerting nearly the same fluid force to seat the valve 87 as the fluid force to unseat said valve 87 and the spring 92 aiding in forcing the seating of the valve 87 on the diaphragm 85 on the other side of which there is a vacuum, which seating remains tight due to the slight flexing of the diaphragm 85, as shown by the clearance between the plate 88 and the diaphragm 85 in Fig. 2 of the drawings. When further pressure, however, is exerted from the foot pedal 12 the pressure, which up to this point is received by the tube 42 and the pressure chamber 43 will have been insufficient to move the diaphragm 85 to unseat the atmospheric inlet valve 87, will now push the valve 87 off its seat in opposition to the force of the spring 92, as the diaphragm 85 will then be flexed further to the right and the ferrule 90, 93 will also be moved to the right, thus simultaneously closing by tightly seating the valve 55 and moving the plunger 39 to the right in Fig. 2 so as to seal the chamber within the cylinder 34 by reason of the seal 34a. The said plunger 39 is, therefore, now moved initially due to the manual pressure from the liquid in the tube 42 but as to in any event permit the manual application of the manual pressure on the brakes through the pipe 30, cylinder 34 and pipe 115 in case there should be any failure of the power from the operation of the power unit. However, in the normal operation of the apparatus at this point, due to the seating of the valve 55 and the unseating of the valve 87, the pressure of the atmospheric air entering through the passageways 78 and 83 and air chamber 86 will pass through the ports 93a in the ferrule 93 and the openings 100 to the face of the piston 101 so as to force the same to the right in Fig. 2, in view of the vacuum which is present on the other side of said piston, and, owing to the very large diameter of the piston 101 as compared to the diameter of the plunger 39, the very low manual force applied, as, for example, 50 to 400 lbs. per square inch, will be supplanted by a pressure up to but not exceeding 1200 lbs. per square inch in the tube 115 supplying the liquid to the brake cylinders 117. This maximum pressure to be obtained can be determined by the adjustment of the rotatable vacuum adjuster 66, and if, due to wear in the automobile, the maximum obtained is less than said maximum, the vacuum can be adjusted again by the rotatable adjuster 66 to provide a more effective vacuum due to the changed tension in the spring 60. It will be noted also that the diaphragm supporting plates 88 and 95 and the peripheral supports of said diaphragms are, respectively, of the same size so that the effective areas of each diaphragm, that is to say the portion subjected to the differential between the two pressures on opposite sides thereof, is approximately the same as in the other diaphragm, to prevent sudden changes of movement. Also, the force tending to seat the valve 87 normally is nearly equal to the force tending to unseat said valve. In this way a very powerful force is brought to bear upon the brake-shoes 120 and 121 according to the degree of the low manual pressure exerted. However, very little brake fluid will have been used or needed to be brought into motion to bring about the braking action, as the brake-shoes will have already been brought previously into position before the braking action by the manual force applying the liquid to the brake-shoes. Furthermore, it will be seen that this is accomplished by a very small degree of movement of the foot pedal as very little motion is required to bring the brake shoes into operative position and substantially all of the subsequent effort is merely the exertion of the manual pressure with extremely little movement of the hydraulic fluid leading to the brake-shoes. In other words, the great disadvantage of previous hydraulic systems of requiring the foot to move through an extensive range with consequent danger of ineffectiveness, especially when used with boosters, is obviated. Upon the release of the pressure from the foot pedal 12 the spring 92 extends to close the valve 87 and the valve 55 opens so that air from within the left end of the cylinder 99 is exhausted, due to the vacuum in the pipe 73, and therefore the plunger 39 moves to the left, in Fig. 2, until the seal 34a is uncovered, thereby permitting the escape of any possible excess of the liquid which has been trapped beyond the end of the plunger 39 and releasing the brakes, so that the parts for operating the brakes are again in position for action whenever the brakes are to be applied, as previously described. In the event that the power unit should fail to operate, the brakes may still be applied manually by forcing the hydraulic fluid from the pipe 21 through the pipe 30, around the right-hand end of the plunger 39 into the chamber 34, and thence to the brake cylinders 117 through the pipes 115 and 116.

The operation of the modification shown in Fig. 5 is substantially the same as in the form of my invention in the preceding figures except in this instance air pressure takes the place of the atmospheric pressure on the left face of the piston 101, the other face of said piston being in communication with the outer air through the breather tube 126. In this instance, after the brake shoes have been moved into position initially by the hydraulic fluid through the pipes 30 and 115 the further pressure of the same acting on the plunger 51 tightly closes the valve 55 and causes the valve 87 to open because the diaphragm 85 is then further bowed to the right and the valve pushed off its seat by the ferrule 90, 93, thus admitting compressed air through said ferrule to the left face of the piston 101 which causes the latter to move to the right. The plunger 39 is then moved to the right, cutting off the communication between the pipe 30 and the passageway in the cylindrical member 34 and applying the high pressure in the liquid trapped therein to the brake-shoes 120, 121 on the four wheel brakes, depending upon the amount of the modulated pressure applied by the foot to the pedal 12. Upon the release of the foot pressure in the off-modulation the braking effect can be released as much as desired until finally upon the release of all foot pressure the parts are restored to their initial positions.

While I have described my invention above in detail I wish it to be understood that many changes may be made therein without departing from the spirit of the same.

I claim:

1. A valve structure having a connection for receiving a pressure differing from the atmospheric pressure, comprising a flexible diaphragm, an inlet valve and an outlet valve adapted to seat against opposite sides of the diaphragm and manual means connected to close the outlet valve and, with the movement of the diaphragm, to open the inlet valve.

2. A valve structure having a connection for receiving pressure differing from the atmospheric pressure, comprising a diaphragm, an inlet valve and an outlet valve adapted to seat thereon, and another diaphragm on which one of said valves is mounted.

3. A valve structure having a connection for receiving pressure differing from the atmospheric pressure, comprising a diaphragm, an inlet valve and an outlet valve adapted to seat thereon, and diaphragm supporting means on opposite sides of said diaphragm, opposite to which said inlet and outlet valves seat, respectively, adapted to prevent the diaphragm from moving in either direction beyond a predetermined position.

4. A valve structure having a connection for receiving pressure differing from the atmospheric pressure, comprising a diaphragm, an inlet valve and an outlet valve adapted to seat thereon, and diaphragm supporting rings on opposite sides of said diaphragm, opposite to which said inlet and outlet valves seat, respectively, adapted to prevent the diaphragm from moving in either direction beyond a predetermined position in the seating of the inlet valve.

5. A valve structure comprising a flexible diaphragm, a valve adapted to seat against one side of said diaphragm, means adapted to flex the diaphragm into a bowed position adjacent to the point where said valve is seated, and a second valve adapted to seat against the flexed portion of the diaphragm on the other side of the diaphragm.

6. A valve structure having a connection for receiving pressure differing from the atmospheric pressure, comprising a diaphragm, an inlet valve and an outlet valve adapted to seat thereon, a second diaphragm on which the inlet valve is carried, a plate for limiting the flexing of the second diaphragm, and a plate for limiting the flexing of the first diaphragm, the said plates being of substantially the same diameter.

7. A valve structure having a connection for receiving pressure differing from the atmospheric pressure, comprising a diaphragm, an inlet valve and an outlet valve adapted to seat thereon, a second diaphragm on which the inlet valve is carried, a plate for limiting the flexing of the second diaphragm, a plate for limiting the flexing of the first diaphragm, and a rigid means connecting the said diaphragms, plates and inlet valve together.

8. A valve structure comprising a diaphragm adapted to act as a valve seat, a normally open valve adapted to seat thereon, a normally closed valve adapted to seat also on said diaphragm, a second diaphragm on which the normally closed valve is supported, and means to operate said valve for the performance of work, including means to normally apply a pressure differing from the atmospheric pressure between the normally closed valve and the first mentioned diaphragm and to one side of the second diaphragm and another pressure differing from the first-mentioned pressure between the normally closed valve and the other side of said second diaphragm.

9. A valve structure comprising a diaphragm adapted to act as a valve seat, a normally open valve adapted to seat thereon, a normally closed valve adapted to seat also on said diaphragm, a second diaphragm on which the normally closed valve is supported, and means to operate said valve for the performance of work, including means to normally apply a pressure differing from the atmospheric pressure between the normally closed valve and the first mentioned diaphragm and to one side of the second diaphragm and another pressure differing from the first-mentioned pressure between the normally closed valve and the other side of said second diaphragm, the effective areas of each of said two diaphragms exposed to the differential of said first and second pressures being approximately the same.

10. A valve structure having a connection for receiving pressure differing from the atmospheric pressure, comprising a diaphragm, an inlet valve and an outlet valve being adapted to seat thereon, one of said valves being smaller than the other, supports on the opposite sides of said diaphragm to support said valves respectively, the said supports being overlapping at the outer periphery of the outlet valve support and the inner periphery of the inlet valve support.

11. A valve structure comprising a first diaphragm, a second diaphragm, a casing on which they are supported, having a port giving access for a fluid to the first diaphragm, a manually operable valve seating on said first diaphragm, a second valve seating on the other side of said diaphragm and supported by said second diaphragm, and means for clamping said two diaphragms to said casing in spaced relationship, providing a port giving access to a fluid of another pressure intermittently to a side of said second valve normally inaccessible to said other pressure so as to control the application of said second pressure by said second valve for the performance of work.

12. A valve structure comprising a first diaphragm, a second diaphragm, a casing on which they are supported, having a port giving access for a fluid to the first diaphragm, a manually operable valve seating on said first diaphragm, a second valve seating on the other side of said diaphragm and supported by said second diaphragm, means for clamping said two diaphragms to said casing in spaced relationship, providing a port giving access to a fluid of another pressure intermittently to a side of said second valve normally inaccessible to said other pressure so as to control the application of said second pressure by said second valve for the performance of work, and a rigid connecting means between the said two diaphragms having a passageway providing a communication between the inner and outer faces of both diaphragms.

13. A valve structure comprising a first diaphragm, a second diaphragm, a casing on which they are supported, having a port giving access for a fluid to the first diaphragm, a manually operable valve seating on said first diaphragm, a second valve seating on the other side of said diaphragm and supported by said second diaphragm, means for clamping said two diaphragms to said casing in spaced relationship, providing a port giving access to a fluid of another pressure intermittently to a side of said second valve normally inaccessible to said other pressure so as to control the application of said second pressure by said second valve for the performance of work, and a rigid connecting means between the said two diaphragms having a passageway providing a communication between the inner and outer faces of both diaphragms and a spring in said passageway adapted to be compressed upon unseating the second valve.

14. A valve structure comprising a first diaphragm, a second diaphragm, a casing on which they are supported, having a port giving access for a fluid under sub-atmospheric pressure to the first diaphragm, a manually operable valve seating on said first diaphragm, a second valve seating on the other side of said diaphragm and supported by said second diaphragm, and means for clamping said two diaphragms to said casing in spaced relationship, providing a port giving access to a fluid under atmospheric pressure intermittently to a side of said second valve normally inaccessible to said other pressure so as to control the application of said second pressure by said second valve for the performance of work.

15. A valve structure comprising a first diaphragm, a second diaphragm, a casing on which they are supported, having a port giving access for a fluid under atmospheric pressure to the first diaphragm, a manually operable valve seating on said first diaphragm, a second valve seating on the other side of said diaphragm and supported by said second diaphragm, and means for clamping said two diaphragms to said casing in spaced relationship, providing a port giving access to a fluid under superatmospheric pressure intermittently to a side of said second valve normally inaccessible to said other pressure so as to control the application of said second pressure by said second valve for the performance of work.

16. A valve structure, comprising a diaphragm, a fluid pressure controlling valve adapted to seat thereon, a second fluid pressure controlling valve connected to and movable with said diaphragm, and means to apply normally in the closed position of the second valve very nearly the same fluid force in one direction tending to seat said second valve as the fluid force in the opposite direction tending to unseat the said second valve.

17. A valve structure, comprising a diaphragm, a valve adapted to seat thereon, a second valve connected to said diaphragm, means to apply normally very nearly the same force in one direction tending to seat said second valve as the force in the opposite direction tending to unseat said second valve, and a second diaphragm on which said second valve is mounted.

18. A valve structure, comprising an outlet valve, a diaphragm on which it seats, a second diaphragm, an inlet valve rigidly connected to both of said diaphragms, and a housing for said diaphragms having inlet and outlet ports for a pressure fluid.

19. A valve structure, comprising an outlet valve, a diaphragm on which it seats, a second diaphragm, an inlet valve rigidly connected to both of said diaphragms, a housing for said diaphragms having inlet and outlet ports for a pressure fluid, a plate connected to said housing, and a spring, adapted to move said diaphragm, seated on said plate.

EDWARD A. ROCKWELL.